UNITED STATES PATENT OFFICE.

SAMUEL A. BULLOCK, OF PLANDOME, NEW YORK, ASSIGNOR TO ALLY COMPANY, INC., OF NEW YORK, N. Y., A CORPORATION OF NEW YORK.

RUST-PREVENTIVE COMPOSITION.

1,404,511.

Specification of Letters Patent.

Patented Jan. 24, 1922.

No Drawing. Application filed August 23, 1920, Serial No. 405,390. Renewed December 6, 1921. Serial No. 520,383.

*To all whom it may concern:*

Be it known that I, SAMUEL A. BULLOCK, of Plandome, in the county of Nassau and State of New York, have invented a certain new and useful Improvement in Rust-Preventive Compositions, of which improvement the following is a specification.

The object of my invention is the production of a composition for application to finished surfaces of metals, for the protection thereof from corrosion resultant upon the action of air, water, or brine, which compound shall possess the capabilities of being readily applied to the surfaces to be protected; of delaying drying hard thereon; of adhering thereto without liability to be rubbed off by rough handling; and of being readily removed by the application of a suitable solvent when desired.

The improvement claimed is hereinafter fully set forth.

My composition consists of a mixture of bituminous paint, made by blending coal tar, pitch, heavy bodied blown petroleum residual pitch, or asphalt with an oleo resinous mineral thinner, with an evaporating oil, as kerosene, and an oil known in the trade as fuel oil, which mixture forms a resilient covering for finished metal surfaces, which effectually prevents the formation of rust thereon.

In preparing the composition, I prefer to use the ingredients in about the following proportions, viz: bituminous paint, 75 per cent; evaporating oil, preferably kerosene, 10 per cent; and fuel oil, 15 per cent. The composition is sufficiently fluid to be applied to the surfaces to be protected, by a brush or air gun, and after standing for a few hours, hardens so as to become a resilient covering, which will not be accidentally rubbed off by rough handling of the coated articles, but which is sufficiently soluble to be readily removable by slight rubbing with a rag or waste saturated with kerosene.

I claim as my invention and desire to secure by Letters Patent:

1. A composition, suited for application to finished metal surfaces, for preventing the formation of rust thereon, comprising bituminous paint, an evaporating oil, and fuel oil.

2. A composition, suited for application to finished metallic surfaces, for preventing the formation of rust thereon, comprising about 75 per cent bituminous paint, 10 per cent kerosene, and 15 per cent fuel oil.

SAMUEL A. BULLOCK.

Witnesses:
J. SNOWDEN BELL,
HENRY LEIFHEIT.